United States Patent
Rao et al.

(10) Patent No.: US 9,747,340 B2
(45) Date of Patent: Aug. 29, 2017

(54) METHOD AND SYSTEM OF USING A LOCAL HOSTED CACHE AND CRYPTOGRAPHIC HASH FUNCTIONS TO REDUCE NETWORK TRAFFIC

(75) Inventors: Ravi T. Rao, Redmond, WA (US); Sandeep K. Singhal, Kirkland, WA (US); See-Mong Tan, Redmond, WA (US); R Scott Briggs, Redmond, WA (US); Kushal Narkhede, Bellevue, WA (US); Eliot John Flannery, Redmond, WA (US); Nilesh R. Shah, Bothell, WA (US); Gianluigi Nusca, Seattle, WA (US); Khawar Mahmood Zuberi, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1365 days.

(21) Appl. No.: 12/141,950

(22) Filed: Jun. 19, 2008

(65) Prior Publication Data
US 2009/0319473 A1 Dec. 24, 2009

(51) Int. Cl.
*G06F 7/00* (2006.01)
*G06F 17/30* (2006.01)
*G06F 17/00* (2006.01)

(52) U.S. Cl.
CPC ...... *G06F 17/3048* (2013.01); *G06F 17/3033* (2013.01); *G06F 17/30132* (2013.01); *G06F 17/30949* (2013.01)

(58) Field of Classification Search
CPC ............. G06F 17/3048; G06F 17/3033; G06F 17/3046; G06F 17/30949; G06F 17/30132
USPC .......................................... 707/999.002, 698
See application file for complete search history.

(56) References Cited

U.S. PATENT DOCUMENTS

| | | | |
|---|---|---|---|
| 5,452,447 A | 9/1995 | Nelson et al. | |
| 5,860,153 A * | 1/1999 | Matena et al. | 711/216 |
| 6,311,216 B1 * | 10/2001 | Smith et al. | 709/226 |
| 6,377,991 B1 * | 4/2002 | Smith et al. | 709/226 |
| 6,415,280 B1 * | 7/2002 | Farber et al. | 707/698 |
| 6,601,102 B2 | 7/2003 | Eldridge et al. | |
| 6,661,904 B1 | 12/2003 | Sasich et al. | |
| 6,757,705 B1 | 6/2004 | Pardikar et al. | |

(Continued)

FOREIGN PATENT DOCUMENTS

| | | |
|---|---|---|
| CN | 1669009 A | 9/2005 |
| JP | 2003-271442 | 9/2003 |

(Continued)

OTHER PUBLICATIONS

Iyer et al, "Squirrel: A decentralized peer-to-peer web cache", 2002, ACM, pp. 213-222.*

(Continued)

*Primary Examiner* — Kannan Shanmugasundaram

(57) ABSTRACT

The described method and system enables a client at a branch office to retrieve data from a local hosted cache instead of an application server over a WAN to improve latency and reduce overall WAN traffic. A server at the data center may be adapted to provide either a list of hashes or the requested data based on whether a hosted cache system is enabled. A hosted cache at the client side may provide the data to the client based on the hashes. The hashes may be generated to provide a fingerprint of the data which may be used to index the data in an efficient manner.

20 Claims, 10 Drawing Sheets

(56) References Cited

U.S. PATENT DOCUMENTS

| | | | |
|---|---|---|---|
| 6,766,313 | B1 | 7/2004 | Kromann |
| 6,912,591 | B2* | 6/2005 | Lash ............................ 709/246 |
| 6,959,320 | B2 | 10/2005 | Shah et al. |
| 6,996,584 | B2 | 2/2006 | White et al. |
| 7,092,997 | B1* | 8/2006 | Kasriel et al. ................ 709/213 |
| 7,113,962 | B1 | 9/2006 | Kee et al. |
| 7,171,439 | B2 | 1/2007 | Honig |
| 7,392,348 | B2* | 6/2008 | Dumont ......................... 711/137 |
| 7,437,364 | B1* | 10/2008 | Fredricksen et al. |
| 7,461,262 | B1 | 12/2008 | O'Toole, Jr. |
| 7,849,269 | B2* | 12/2010 | Sundarrajan et al. ........ 711/139 |
| 8,468,245 | B2* | 6/2013 | Farber et al. ................. 709/226 |
| 2001/0027479 | A1 | 10/2001 | Delaney et al. |
| 2001/0042171 | A1* | 11/2001 | Vermeulen .................... 711/118 |
| 2002/0161908 | A1 | 10/2002 | Benitez |
| 2003/0093488 | A1 | 5/2003 | Yoshida et al. |
| 2003/0236857 | A1 | 12/2003 | Takase et al. |
| 2004/0064485 | A1* | 4/2004 | Yoshida et al. ............... 707/201 |
| 2004/0153576 | A1 | 8/2004 | Hansmann et al. |
| 2005/0102370 | A1 | 5/2005 | Lin et al. |
| 2005/0198296 | A1* | 9/2005 | Teodosiu et al. ............. 709/225 |
| 2005/0289648 | A1* | 12/2005 | Grobman et al. ............... 726/12 |
| 2006/0168318 | A1* | 7/2006 | Twiss ............................ 709/238 |
| 2006/0184652 | A1 | 8/2006 | Teodosiu et al. |
| 2006/0248195 | A1 | 11/2006 | Toumura et al. |
| 2007/0050491 | A1 | 3/2007 | Kataoka et al. |
| 2007/0150577 | A1 | 6/2007 | Lowery et al. |
| 2007/0174426 | A1 | 7/2007 | Swildens et al. |
| 2008/0082648 | A1* | 4/2008 | Ahmed et al. ................ 709/223 |
| 2008/0235239 | A1* | 9/2008 | Penton et al. .................. 707/10 |
| 2008/0243992 | A1 | 10/2008 | Jardetzky et al. |
| 2009/0157802 | A1* | 6/2009 | Kang et al. ................... 709/203 |
| 2009/0307302 | A1* | 12/2009 | Tennant et al. ............... 709/203 |

FOREIGN PATENT DOCUMENTS

| | | |
|---|---|---|
| JP | 2004-185263 | 7/2004 |
| WO | WO 9613951 | 5/1996 |
| WO | 9903047 A1 | 1/1999 |
| WO | WO 03069927 | 8/2003 |
| WO | 2005084132 A2 | 9/2005 |

OTHER PUBLICATIONS

R. Fielding et al, "Hypertext Transfer Protocol—HTTP/1.1", 1999, available online: http://www.ietf.org/rfc/rfc2616.txt.*
Baccala, "Connected: An Internet Encyclopedia", 2001, available online: http://web.archive.org/web/20010803173627/http://www.freesoft.org/CIE/Topics/141.htm.*
"Caching and CARP in ISA Server 2006", Date: Sep. 5, 2006, pp. 1-12, http://www.microsoft.com/technet/isa/2006/cache_concepts.mspx.
"P2P Bridge", pp. 1-3, http://p2pbridge.sourceforge.net/, Jun. 19, 2008.
Davison Brian D. "A Web Caching Primer", IEEE Internet Computing, Date: Jul./Aug. 2001, pp. 38-45, vol. 5, Issue: 4.
Kalnis, et al., "An Adaptive Peer•to•Peer Network for Distributed Caching of OLAP Results", Proceedings of the 2002 ACM SIGMOD International Conference on Management of Data, Session: Research session: data warehousing and archive, Jun. 4-6, 2002, pp. 12.
Ip, et al., "COPACC: An Architecture of Cooperative Proxy-Client Caching System for On-Demand Media Streaming", IEEE Transactions on Parallel and Distributed Systems, vol. 18, Issue 01, Jan. 2007, pp. 30.
Annapureddy, et al., "Shark: Scaling File Servers via Cooperative Caching", In Proceedings 2nd Symposium on Networked Systems Design and Implementation (NSDI), vol. 02, May 2005, pp. 14.
Elkiss, et al., "Peercache: Query Result Caching using Peer Networks", Apr. 21, 2006, pp. 30.
Barreto, et al., "Fast hashing onto elliptic curves over fields of characteristic 3", Retrieved at <<http://citeseerx.ist.psu.edu/viewdoc/download?doi=10.1.1.21.7961&rep=rep1&type=pdf>>, Nov. 15, 2001, pp. 11.
"Digital Signatures and PKCS#11 Smart Cards Concepts, Issues and some Programming Details", As retrieved Jun. 25, 2011 from <<http://web.archive.org/web/20080504005524/http://www.calsoftlabs.com/whitepapers/public-key-cryptography.html>>, California Software Labs, Apr. 2000, pp. 14.
Chinese First Office Action in Application 200980123432.9, mailed Mar. 11, 2013, 8 pgs.
Chinese Second Office Action in Application 200980123432.9, mailed Nov. 26, 2013, 7 pgs.
European Official Communication in Application 09767181.2, mailed Feb. 28, 2011, 2 pgs.
Japanese Notice of Rejection in Application 2011-514644, mailed Mar. 8, 2013, 6 pgs.
Japanese Notice of Allowance in Application 2011-514644, mailed Jan. 17, 2014, 4 pgs.
Russian Notice of Allowance in Application 2010151959, mailed Aug. 29, 2012, 6 pgs.
PCT International Search Report and Written Opinion in International Application PCT/US2009/041267, mailed Dec. 2, 2009, 11 pages.
Chinese $3^{rd}$ Office Action in Application 200980123432.9, mailed May 27, 2014, 6 pages.
Chinese Notice of Allowance in Application 200980123432.9, mailed Nov. 6, 2014, 4 pages.
Korean Notice of Preliminary Rejection in Application 10-2010-7027968, mailed Jan. 26, 2015, 12 pgs.
European Search Report in Application 09767181.2 mailed Feb. 25, 2016, 13 pages.
European Communication in Application 09767181.2 mailed Mar. 15, 2016, 1 page.
European Office Action in Application 09767181.2, mailed Feb. 27, 2017, 12 pgs.
"First Office Action and Search Report Issued in Chinese Patent Application No. 201510014317.5", dated Jun. 2, 2017, 10 Pages.

* cited by examiner

METHOD AND SYSTEM OF USING A LOCAL HOSTED CACHE AND CRYPTOGRAPHIC HASH FUNCTIONS TO REDUCE NETWORK TRAFFIC

FIELD OF INVENTION

The present invention generally relates to computer systems and more particularly for a computing system that improves response times for providing data to a requesting client over a network.

BACKGROUND

A data network configuration general implemented in business environments involves centralizing data storage at a data center and providing this data (e.g., via a server at the data center) to a plurality of client computing devices over a wide area network. The plurality of client computing devices may be located at one or more branches of the WAN. The branches may represent a plurality of computing devices communicatively coupled to each other using a local area network (LAN) that has at least one connection to the WAN. The LAN may be coupled to the WAN via a router or other bridging device as known in the art. In large corporate environments, the data center may be disposed remotely from the branch(es). Applications running on the client devices may require data from the data center (e.g., served via an application center at the data center) to operate. High data traffic on a wide area network (WAN) may generally reduce bandwidth and increase latency for requests for data over the WAN. This may slow down application response times at the computing devices in the branch office.

To help reduce the data traffic on wide area networks and improve bandwidth and latency, some businesses may implement a WAN optimizer system. Generally, a wide area network (WAN) optimizer system is hardware designed to reduce bandwidth consumption on the WAN. A goal of WAN optimizer systems is to reduce the amount of WAN bandwidth for carrying data traffic. Generally, WAN optimizers may operate to intelligently manage (using specific algorithms) the compression and transmission of data to the WAN and the retrieval of the data from the WAN. By compressing data traffic on the WAN, data traffic may be reduced with a corresponding decrease in congestion. As congestion is reduced on the WAN, router latency, jitter and packet loss are may also correspondingly decrease.

While existing WAN optimizer systems provide general improvements in WAN bandwidth, existing WAN optimizer systems may not be suited to handle encrypted data or provide end-to-end security. Moreover, existing WAN optimizer systems may require operation of interface hardware at both the data center and at each branch office, thereby incurring increased maintenance costs.

SUMMARY OF INVENTION

The method and system enables a client at a branch office to retrieve data from a hosted cache instead of an application server over a WAN to improve latency and reduce overall WAN traffic. A server at the data center may be adapted to provide either a list of hashes or the requested data based on whether a hosted cache system is enabled. A hosted cache at the client side may provide the data to the client based on the hashes. The hashes may generally provide a fingerprint of the data which may be used to index the data.

DRAWINGS

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '$_{13}$ _____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
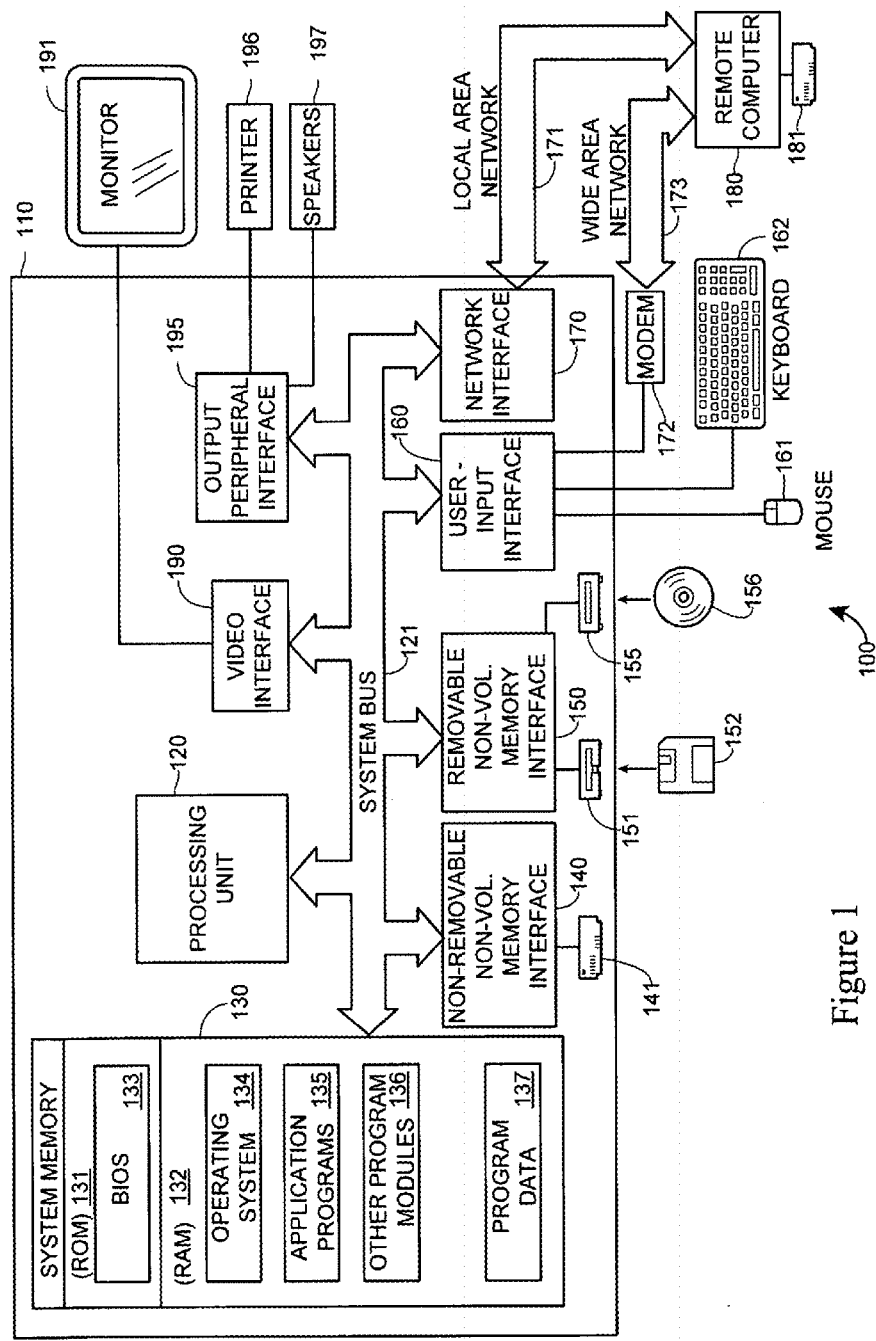
FIG. 1 illustrate block diagrams of a computing system that may operate in accordance with the described embodiments.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit or processor 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

WAN Optimizer Systems

Figure 2:
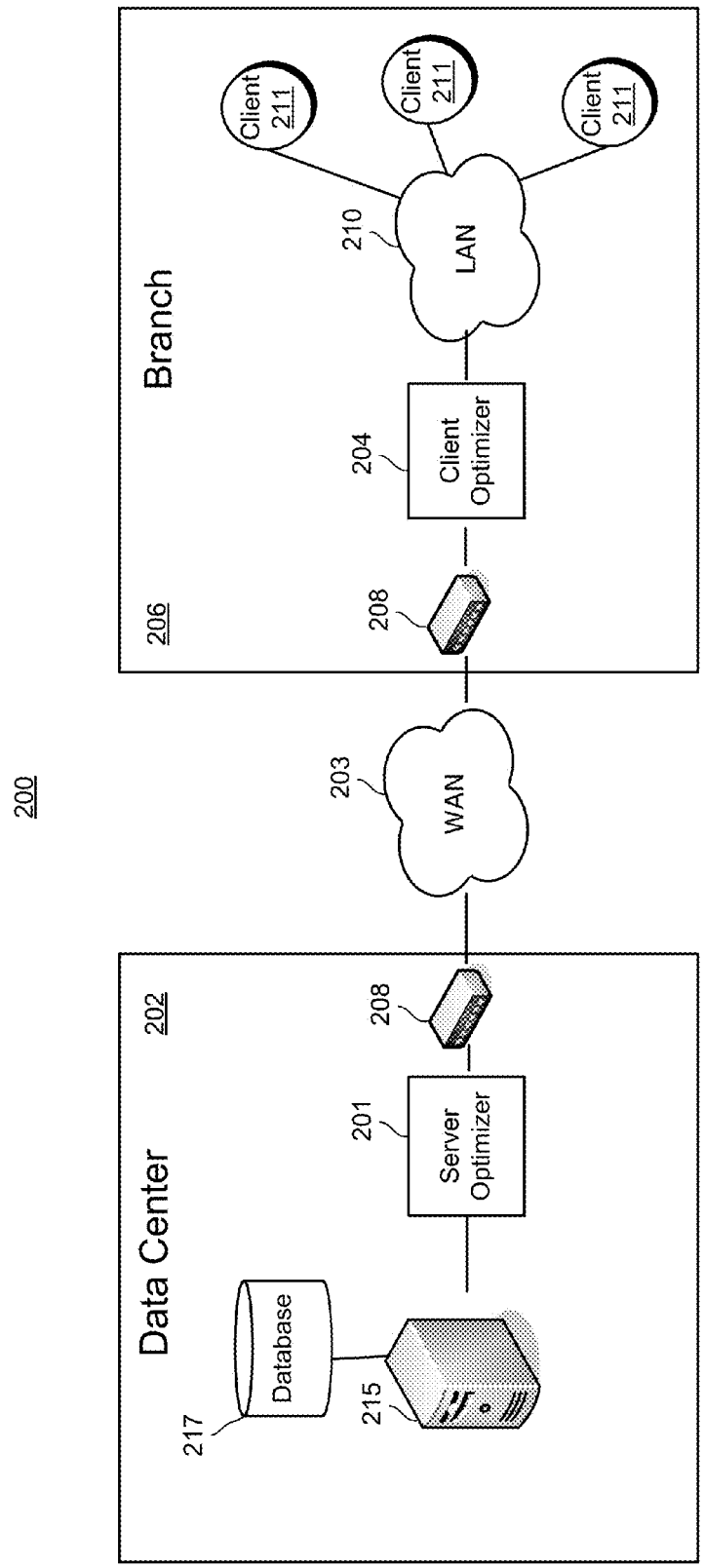
FIG. 2 illustrates a general WAN optimizer system.

FIG. 2 illustrates a wide area network (WAN) implementing a WAN optimizer system 200 as generally known in the art. A WAN optimizer system may generally be deployed at both sides of a wide area network connection.

WAN optimizer systems generally involve a couple of component hardware devices: a server side component 201 generally implemented at a data center 202 on one side of a WAN 203 and a client side component 204 at a branch 206. In many cases, a WAN optimizer component device (server 201 or client component 204) may be disposed behind a WAN router 208 (e.g., coupled to the router at a port opposite from the WAN connection). These devices 201 and 204 may operate to tune application traffic destined for the WAN 203 so that application performance via the WAN 203 is improved. The result may be WAN acceleration and faster application response time. This may provide end users at a branch office and also mobile workers (connecting, for example, via a laptop or other mobile computing device), higher access speeds to critical applications.

A branch 206 may include a plurality of client computers 211 that generally request data from the data center 202. In some corporate environments, branches may be implemented to divide functionality (e.g., accounting, procurement, customer service, etc.). In some corporate environments, a branch 206 may provide specific geographic service locations. Generally, the client computers 211 may execute one or more business applications that access one or more application servers 215 at the data center 202.

The application server 215 may be coupled to a data base 217 (e.g., located at the data center or remotely from the data center) for providing data to the applications executed by the application server 215 and provided to the clients 211 at the branch office over the WAN 203. Of course, instead of a branch configuration using a LAN 210, FIG. 2 is equally applicable to any client device connected to the WAN for receiving traffic from the server 215 via the WAN, e.g., remote laptops connecting via the Internet.

WAN Optimizer Functionality

Generally, the server side WAN optimizer device 201 may operate to inspect and index data packets originated by a server of the data center (e.g., server 215), compress the data packets based on the inspection, and transmit the data packets over the WAN 203. The client side WAN optimizer component 204 may operate to receive the compressed data from the server side component 201 over the WAN 203, decompress the data packets and provide the data to a requesting client 211 device at the branch 206.

In some WAN optimizer systems, the server side component device 201 may index data for scheduling transmission (e.g., by priority) of the data. The WAN optimizer component device at the client 204 may also operate to cache the data based on the indexing performed by the server device 201. When a second request from a client 211 at branch 206 is received for the same data at the client side WAN optimizer device 204, the client side WAN optimizer device 204 may simply return data from its cache instead of going over the WAN 203.

Problems with WAN Optimizers

As illustrated in FIG. 2, existing WAN optimizer systems 200 generally require installation of a first component device 201 at a server end, such as a data center 202, and a second component device 204 at a client end, such as a branch office 206, where the data center 202 and branch office 206 communicate over a wide area network (WAN) 203. In environments having a plurality of branch offices 206, multiple client side optimizer devices 204 may need to be installed.

The operation of multiple component devices adds costs in installation and maintenance. In particular, because WAN optimizers require highly detailed (i.e., high granularity) inspection of data traffic, a large amount of processing overhead may be incurred for operation of the optimizer system. Moreover, because the inspection process of existing WAN optimizers requires a fine level of granularity of the data portions (i.e., the optimizer generally needs to understand what the data is so that it can categorize the data or otherwise operate on the data), WAN optimizers generally are not able to operate on encrypted data (e.g., when data is sent over a network using an end-to-end encryption protocol such as IP Security, or IPSec, protocol or Secured Sockets Layer, or SSL, protocol). In this case, the WAN optimizers may have no effect on WAN traffic as they cannot operate on this data stream (the WAN optimizer server side component may not understand the encrypted data, and thus, the existing WAN optimizer system may not be able to compress or index the encrypted data). Furthermore, because WAN optimizers need to inspect and understand the data, end-to-end security may not be easily provided using existing WAN optimizers. Also, since security is generally a major concern in most corporate environments in which a WAN includes public traffic (e.g., a connection to the Internet) the WAN optimizer may not provide useful compression and latency benefits to secured traffic (e.g., encrypted).

Optimization Using Hosted Cache

Figure 3:
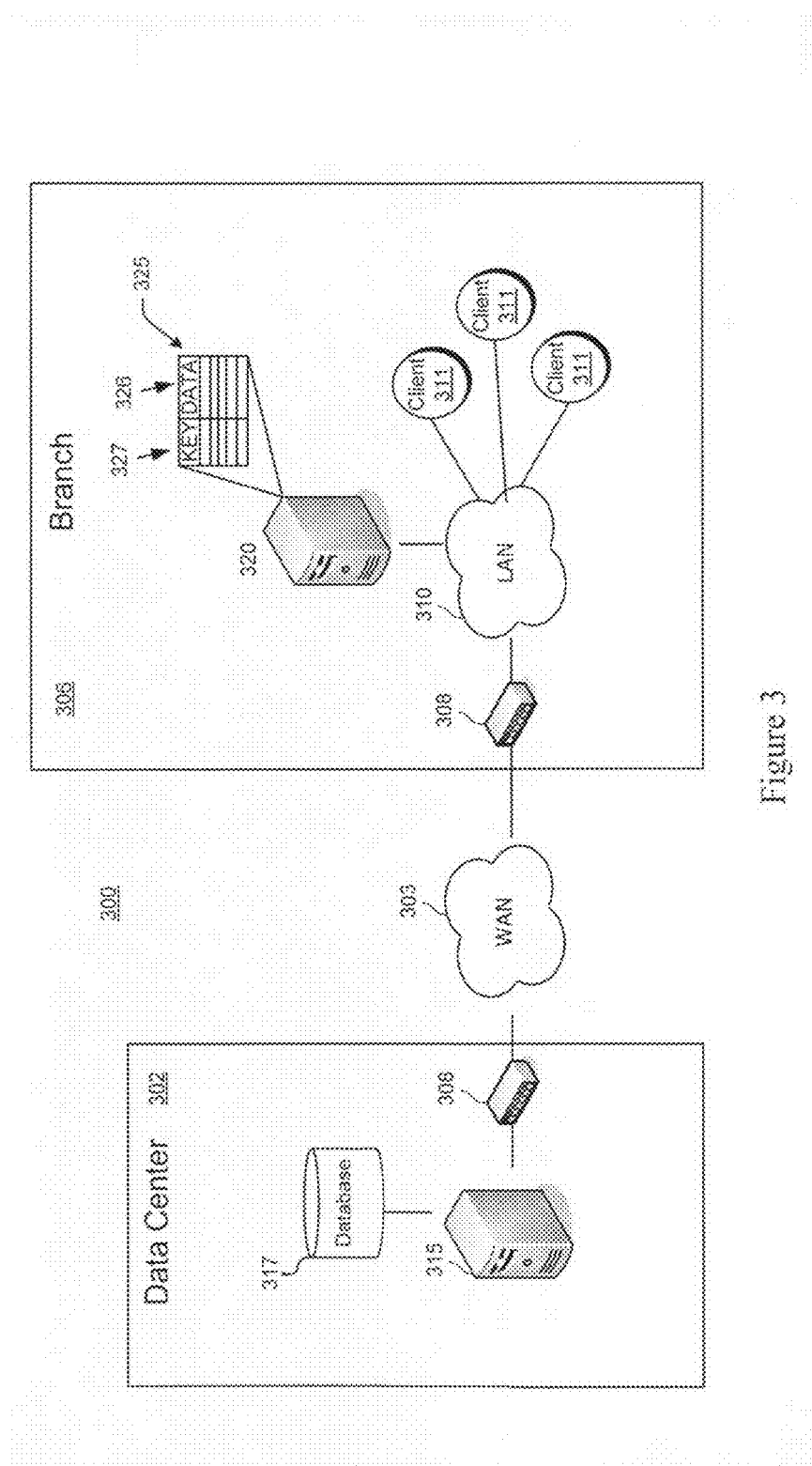
FIG. 3 illustrates a system embodiment of a data retrieval process using a hosted cache.

FIG. 3 illustrates an embodiment of a computing system 300 that provides end-to-end security for optimizing data retrieval by a client device at a branch. Of course, instead of a branch configuration using a LAN, FIG. 3 is equally applicable to any client device connected to the WAN for receiving traffic from the server via a WAN (e.g., a laptop connection). It should be noted that the term client may be used to mean a physical computing device or a client application running on a computing device that requests data from a server. Multiple applications may be executed by the same computing device.

General operation of the system of FIG. 3 will now be described. A data center 302 provides data via an application server 315 to a client 311 at a branch 306. The branch 306 may represent a geographic location in which a plurality of client computers 311 are connected via a local area network or LAN 310. Similar to FIG. 2, the client computers 311 may communicate with server 315 to request and retrieve data stored and managed at data center 302. The client computers 311 may retrieve data via a connection between the LAN 310 and a WAN 303. Connections to the WAN may be via routers 308. In this embodiment, a hosted cache 320 is also coupled to the LAN 310 at the branch 306. The hosted cache 320 may be implemented on a particular computing device or may represent a distributed cache that is implemented in a plurality of computing devices, for example, when the clients are operated in a peer to peer manner (to be discussed further below). The hosted cache 320 may be communicatively coupled to the client via the local area network. In some embodiments, the hosted cache may reside on the same device as a client requesting data, for example any of clients 311.

The clients 311 of FIG. 3 may be programmed to send requests for data to server 315. The application server 315 may be programmed to determine whether a client 311 requesting data is enabled to use a hosted cache 320. The application server 315 may then provide either the data requested by the client 311 or a list of identifiers that specifically identify the data requested by the client 311. The application server 315 may generate the identifiers (e.g., using an algorithm) or another computing entity or application (e.g., a database management system) may generate the identifiers and store them in a location (e.g., a database at the data center) for retrieval by the application server. An example of an identifier is a hash that is produced by a hash function, where the hash may act as a fingerprint of the requested data (to be discussed further below). Where the server is connected to a database 317, the hashes may be stored along with the data in the database 317 or hashed by the server 315 as data is retrieved for transmission to a client.

Some clients 311 may be enabled to use the hosted cache 320, while some clients may not be enabled (e.g., legacy computing devices and systems). When the client 311 is enabled to use the hosted cache 320, the client 311 may be programmed to receive either requested data from the application server 315 or a set of hashes from the application server 315 that corresponds to the requested data. The client 311 may be adapted to use the hashes to retrieve cached data from the hosted cache 320 instead of the application server 315. The hosted cache 320 may be programmed to store received data 326 indexed by corresponding hashes, which may serve as record keys 327. The hosted cache 320 may be further programmed to retrieve and return data 326 corresponding to a hash value or key 327. The hosted cache 320 may store the indexed data using any known listing method, such as a table 325 or other program object.

Hash Functions and Hash Indexing

A hash function is generally an algorithm or well-defined procedure for receiving some kind of data and outputting a relatively small value (e.g., a small integer). The values returned by a hash function may be called hash values, hash codes, hash sums, or simply hashes. Moreover, depending on the particular hash function, the hash may provide a statistically unique fingerprint of a data portion (e.g., segment, packet, block, etc.). Sometimes these hash functions may be called cryptographic hash functions. The hash fingerprint may be used to perform a data integrity analysis on the data corresponding to the hash. For example, when data is returned based on a hash, the data may be inputted into the same hash function (if known) to return a hash. If the hashes match, then there may be a statistically high chance that the data received is the same data used to produce the hash.

Hash functions may be used to speed up table lookup or data comparison tasks, such as finding items in a database, detecting duplicated or similar records in a large file, finding similar stretches in data sequences, and so on. In particular, because the hash function provides a relatively unique (e.g., unique for a data range) index in a small number format, reading hash values and indexing based on hash values may generally take less processing time.

Hosted Cache Operation

In one embodiment of the system, the hosted cache 320 may contain a hash table 325 which is used to index the received data 326 by hash values 327. The hosted cache 320 may be maintained, for example, as a data base table, or other listing function or registry in which data may be retrieved by a hash value. Any retrieval mechanism (e.g., a query language call) known in the art may be used to query the hosted cache for data based on hash values (e.g., SQL).

In one embodiment, the hash function may be an encryption algorithm that is based on a public and/or private key pair. In this manner, a hash may represent a cryptographically unique identifier (CUI) of a data portion that is tied to the encryption keys. The implementation of public-private key pair encryption is generally known in the art. In one embodiment using public-private key pair encryption, the client may not require an encryption key. For example, when the client merely passes on hash values to the hosted cache that the client receives from the server, there may not be a need for the client to carry an encryption key. In another example, where data integrity is checked, the client may use an encryption key with the encryption algorithm to verify that the data returned from the server corresponds to a hash.

Of course, a hash function that does not involve encryption keys may be also used to check data integrity functions.

Figure 4:
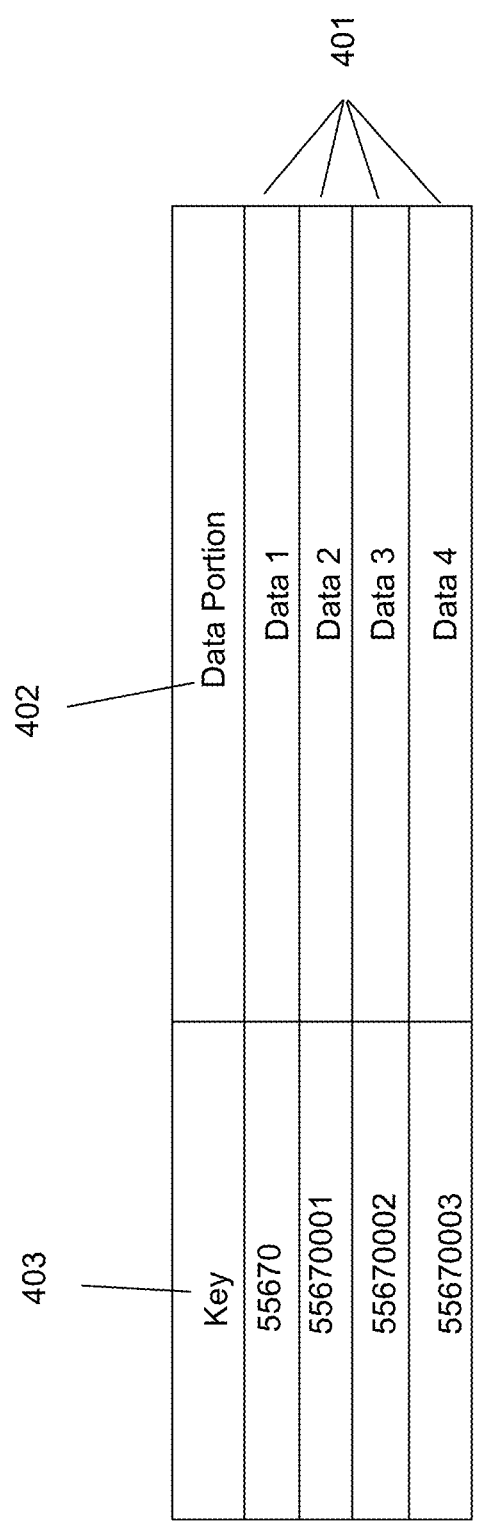
FIG. 4 illustrates a record format for use with a hosted cache.

An embodiment of the hosted cache indexing scheme may use a particular record format, as illustrated in more detail FIG. 4. In the indexing embodiment of FIG. 4, an indexed data store 400 may contain a record 401 having a data portion 402 indexed by a record key 403. The record key 403 may be a hash of the record (where the hash corresponds to a common hash function used in the described system herein). The record key or hash 403 may be a cryptographically unique identifier (CUI). A CUI may have two primary properties. First, the CUI may be statistically unique. Similar to common database indexing schemes, a record key may need to be unique to prevent duplicate entity entries in a table. Accordingly, a CUI may be one that is derived such that there is a high probability that it is unique for a particular situation or application. For example, in a data system as described above, the CUI may be statistically unique if the probability that a cryptographically unique identifier may be derived from the same data portion is unlikely for a range of data values. Second, the CUI may correspond to a particular user hash function, e.g., a common has function being used by the server, client, and hosted cache. In situations in which the hash is a key pair encryption system, the CUI may correspond with a particular public or private key for the particular encryption algorithm used to generate the hash. For example, the CUI may be derived from a public key using the encryption algorithm. In some embodiments, the CUI may be verified to correspond or match with its public key using the algorithm.

The records 401 of FIG. 4 may be used to cache data indexed by hash values. The CUI record hash key 403 may be used to locate each record 401 and retrieve the data portion 402 corresponding to the hash key 403. In one embodiment, the records 401 may be public to a local network, i.e., the indexed information may not be encrypted (except maybe the hash keys). However, other embodiments described below may encrypt the data portions 402 or the records 401.

Multiple Hosted Caches

Figure 5:
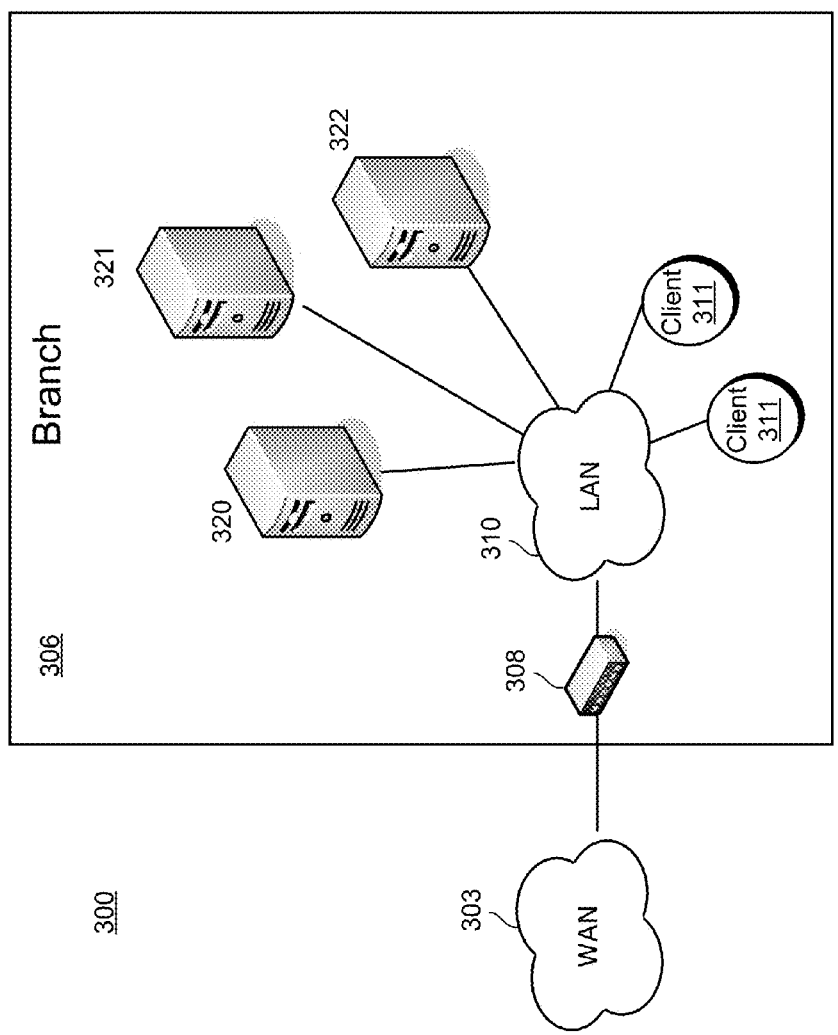
FIG. 5 illustrates a system embodiment implementing a plurality of hosted caches.

FIG. 5 illustrates a system embodiment implementing a plurality of hosted caches 321-322. In this embodiment, a client 311 may communicate or interact with a particular one of the hosted caches 321-322 based on a number of optimization parameters. For example, a business enterprise may provide a hosted cache for a client based on geographic proximity or network proximity (e.g., what is the minimum network routing connections needed to communicate between the cache and client). Moreover, a different hosted cache may be provided based on subnet or other network division. In one embodiment, multiple hosted caches may be provided as a redundancy measure. For example, only a subset of hosted caches (e.g., one hosted cache) may be designated as active and available for connection and interaction with a client. If a failure occurs with the designated hosted cache(s), a redundant hosted cache may be activated. The redundant, inactive hosted cache(s) may be populated and updated with the same information as the designated active hosted cache(s). For example, the data may be replicated across the plurality of hosted caches.

Distributed Hash Table Using a Peer-to-peer Network

Figure 6:
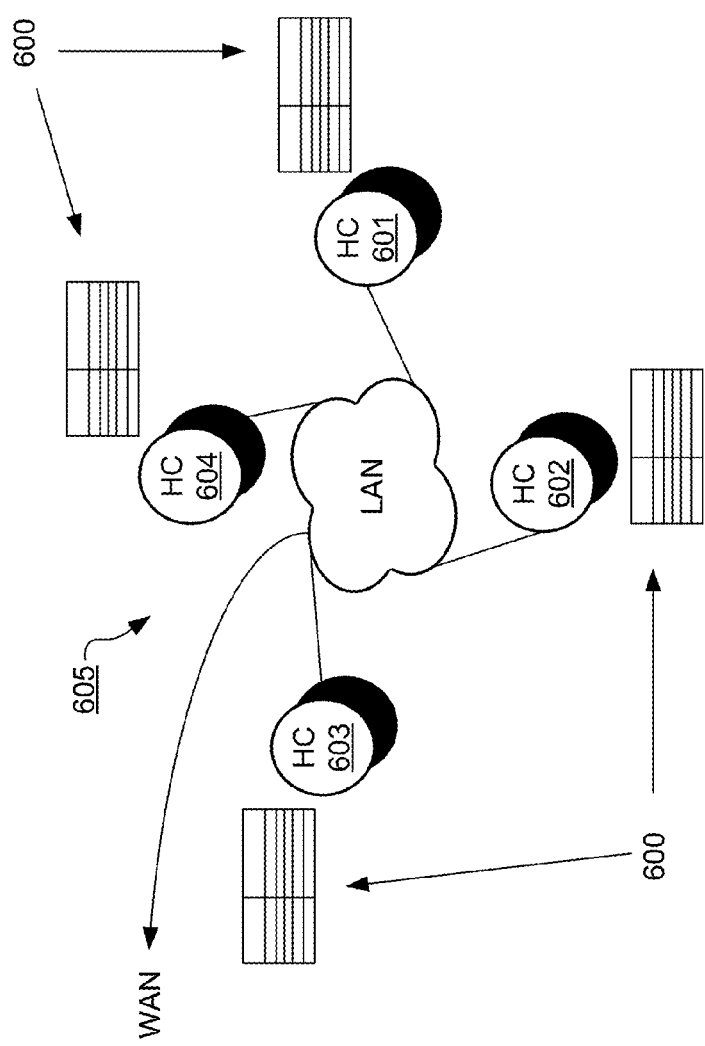
FIG. 6 illustrates a peer-to-peer network embodiment using a distributed cache.

In one embodiment, the clients may be part of a peer to peer network. FIG. 6, illustrates an embodiment using a peer-to-peer network that implements a distributed hosted cache 600. The distributed hosted cache may represent a server-independent persistent indexing system. The distributed cache 600 may be maintained over a group of peer entities 601-604 that form a peer-to-peer network 605. The records in a distributed hosted cache 600 may be logically divided or grouped using, for example, a hash function. The hash function may group, or cluster entries together in some logical order so that retrieval may be made more efficient. The hash function may clump records together in an organized manner, thereby making retrieval more efficient. A distributed hosted cache may have two primary properties: 1) distribution of record contents across a plurality of nodes/clients/peers, such as nodes 601-604; and 2) a routing mechanism (not shown) that provides a method for publishing and retrieving records.

In the embodiment of FIG. 6, the server may be configured as described above to provide a hash of the data to any one of the clients 601-604 requesting information. The client may then send a broadcast request message including the hash to the peer to peer network 605 to locate a peer node in the peer to peer network that contains the data corresponding to the hash. If a peer has previously requested and stored the data, then the peer may reply to the request and provide the data to the peer that sent the broadcast message. In this manner, the hosted cache may be maintained across a plurality of different peers (peer nodes) of the peer to peer network. Thus, a client at the branch may return the requested data based on the hashes provided by the application server. In this embodiment, the peers in the peer to peer network may collaborate to cache the data. While a peer to peer embodiment in described in this section, it should be noted that the method and system may be used on any client-server protocol including protocols not involving peer to peer networks.

Figure 7:
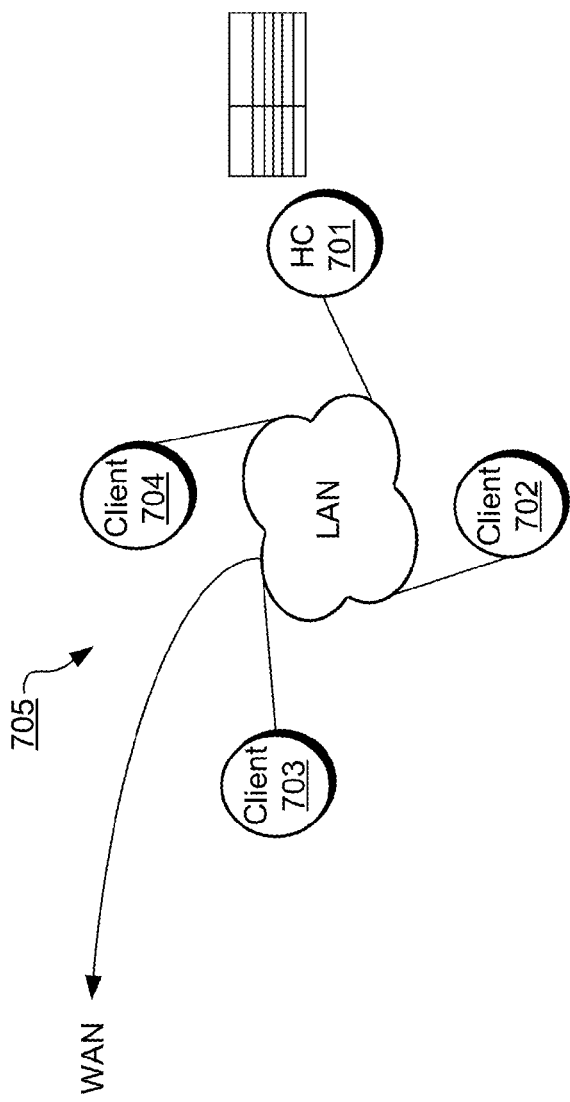
FIG. 7 illustrates a peer-to-peer process embodiment using a dedicated peer for a hosted cache.

FIG. 7 illustrates another peer-to-peer network embodiment that does not use a distributed hosted cache. Instead of implementing a hosted cache across multiple peers where each peer stores a copy of the data or a portion of the data, a single peer 701 may be selected or designated as the sole hosted cache (which may be referred to as a super peer). Clients/nodes/peers 702-704 may be programmed to look to the single peer 701 for hosted cache services and information. However, each of clients 702-704 may be capable of hosting the cache and may do so for redundancy or failover purpose. In this embodiment, several parameters may be considered in the designating or selection of a single peer as the hosted cache. For example, the designation may be based on workload of a peer, processing capacity of the peer, and/or storage capacity of the peer.

Even though only a single peer of FIG. 7 is designated as a hosted cache, each peer acting as a client (702-704) in the peer to peer network 705 may maintain its own hosted cache. In this configuration, a client peer (e.g., 701-704) may request data from a server, receive the set of hashes from the server, and first check whether its local cache includes the data. If the local cache of the peer does not contain the data, then the peer may search the designated hosted cache peer. In another embodiment, in the case of a failure of the peer 701, the other peers in the peer to peer network (e.g., 702-704) may then switch to a distributed hosted cache model in which they begin to search the local caches of the peer network for the data (i.e., a distributed hosted cache model).

The hosted cache may be implemented in a number of ways based on a particular client configuration. As discussed above, the hosted cache does not need to be implemented on a peer to peer network. The hosted cache may be implemented as a operating system component or as a process generally running on a computing device. For example, the hosted cache may be implemented as a Microsoft Windows operating system component.

The hosted cache service provides a focused function of returning data based on hash indexing. Encryption of the data may not have to be implemented because the hosted cache is generally a trusted entity in the branch. However, in some embodiments encryption of the cache may be implemented using any available encryption scheme when appropriate for a particular implementation. For example, an authentication or authorization scheme may be implemented for the hosted cache so that only authorized users may granted access to the hosted cache (e.g., granted access to read from and write to the hosted cache). It should be noted that this security may be entirely implemented at the branch, for example on the LAN.

Different processes may be implemented using the systems described above to provide end-to-end security for data transmission which improves latency.

Figure 8:
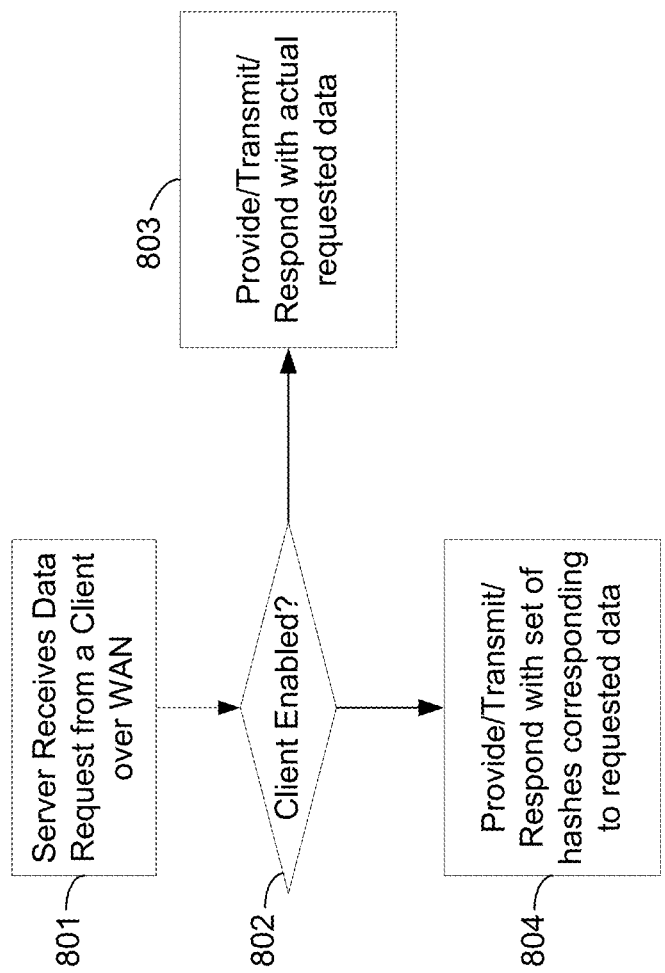
FIG. 8 illustrates a server side process embodiment using the system of FIG. 3.

FIG. 8 illustrates one such process embodiment which may be implemented using the systems described above. In particular, a server, such as application server 315, may receive a data request message from a client over a network 801. The server may determine whether the client is enabled to use a hosted cache 802. In one embodiment, the client request may include a header or other indication that the client is enabled to use a hosted cache. In another embodiment, the server may be programmed to look up whether a client can use the hosted cache by looking up the client in a store (such as registry). In this embodiment, the client may inform the server of the client's identity (e.g., via an identifier in a request message from the client). If the server determines that the client is not enabled to use a hosted cache, the server may process the request by providing the requested data 803. If the server determines that the client is enabled to use a hosted cache, the server may provide the hashes of the data 804 instead of the data itself. In other embodiment, the server may reference a collection of clients that are enabled to use a hosted cache.

In some embodiments, the server may employ additional optimization techniques before or as the server transmits its response to the client request. For example, the server may aggregate a plurality of responses (hashes and/or requested data) and transmit them based on one or more parameters (e.g., a monitored/measured network bandwidth, a schedule, etc.). The server may also order the set of hashes based on the hash function, where the hash function provides an organization (e.g., a sequence or order) to the hash set. The server may also prioritize the data transmission based on the hash set.

In one embodiment, the server may be adapted to index its data using a hash. For example, the server may generate hashes using a hash function on the data files the server has access to. In another embodiment, another device or program may hash the data using a hash function and make the hashes available to the server or other requesting device (e.g., the client or the hosted cache). The hashes may act as an index to the data used to generate the hashes. Moreover, the hashes themselves provide a mechanism for verifying data integrity (to be discussed further below). In one embodiment, the server may execute the hashing function on the requested data only when it is requested. In other embodiments, hashing may be performed independently of the request (e.g., the data may be hashed before any request for the data is received).

Stateful Server Embodiment

In the embodiment described above, the server may be stateless with respect to prior transactions with a client (e.g., previous replies to client data requests). In other words, the server may not remember or store an indication that it has provided any particular data to a client. In an embodiment in which the server does maintain state, then the server may be adapted to determine whether a hosted cache may already store data that is being requested by a client. For example, the server may be programmed to store information indicating whether particular data has been previously requested and sent to a client at a branch, where the client is known to be enabled to use a hosted cache. Upon receiving a subsequent request for the same data, the server may be programmed to simply provide a hash(es) of the data to the client making the subsequent request. This operation may be programmed with the assumption that the hosted cache has cached the previously requested data. If the server does not remember previously sending a requested set of data (or store information indicating that the data has been previously requested or provided), then the server may be programmed to provide the data to the requesting client. In this manner, further latency improvements may be realized where certain back and forth communication between any of the application server, hosted cache, or client may be reduced or prevented. In this embodiment, the server may be programmed to operate without determining whether the client is hosted cache enabled. In an alternative embodiment, the server may still check whether the client is hosted cached enabled. This may be used in hybrid networks that have legacy applications and devices that cannot be enabled to use a hosted cache and requires that the server send only send the particular client (i.e., no hashes). In this case, even though the server has sent the requested data to a client of the branch and the requested data may be stored on a local cache, the legacy device still requires actual data to be returned to operate.

Figure 9:
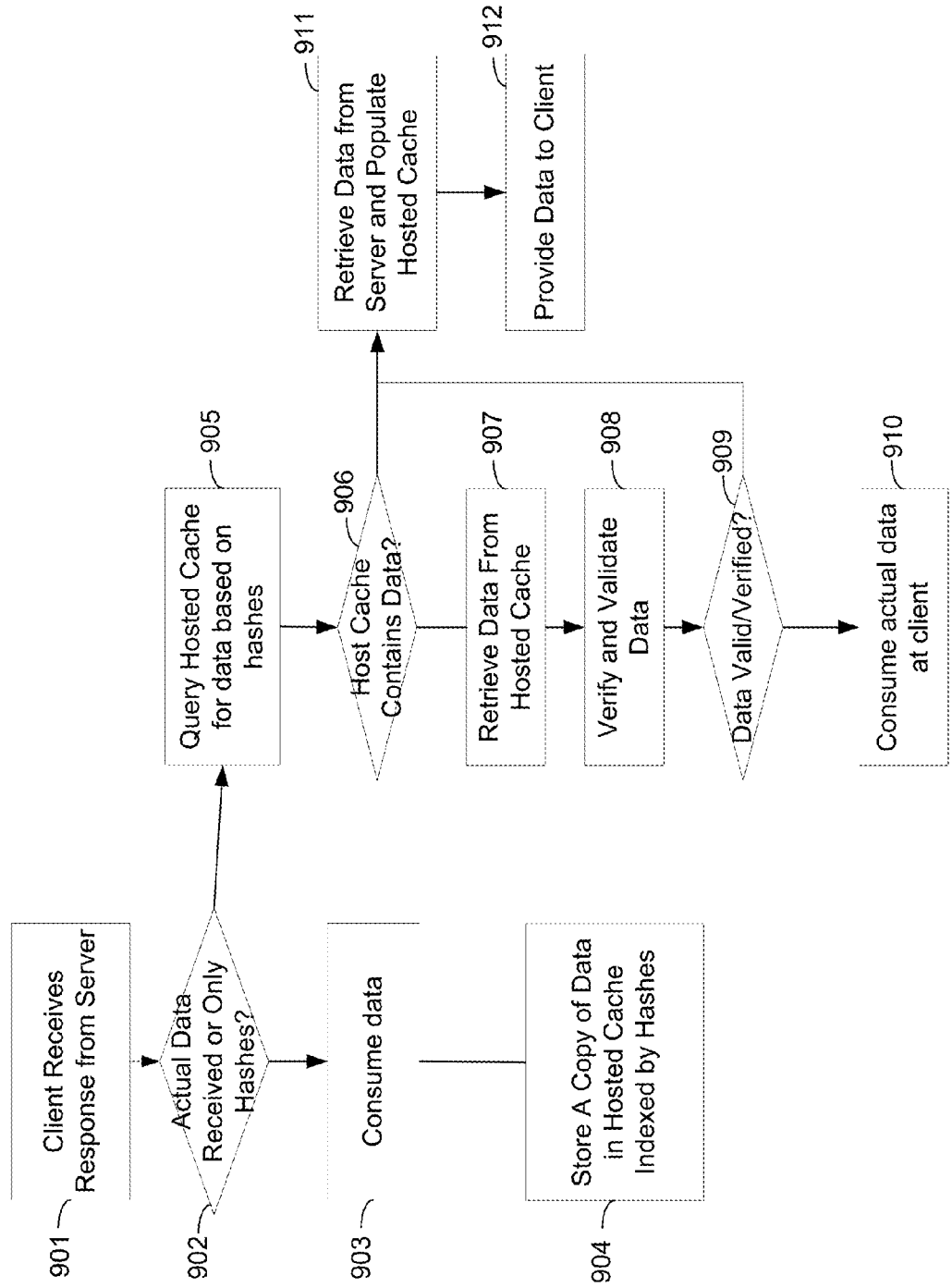
FIG. 9 illustrates a client side process embodiment using the system of FIG. 3.

FIG. 9 illustrates a process of using the system at a branch. A client requesting data may receive a response message(s) from the server 901. The response may include data requested by the client or a set of hashes corresponding to the requested data without the actual set of data. In block 902, the client may be programmed to determine whether the response includes the data or a set of hashes without the data. When the client determines that the response from the server includes the actual data requested, the client may then consume the data 903 and store a copy of the data in the hosted cache 904. The hosted cache may store the data indexed by hash values. The hash values may be generated by either the server and passed along with the actual data (e.g., in block 901). Alternatively, the client may hash the data and provide the hashes to the hosted cache with the actual data. In yet another embodiment, the hosted cache may hash the data. Regardless of which entity performs the hashing function, the hashes may be used by the hosted cache to index the data stored by the hosted cache. Moreover, the hash functions used by any of the entities (when more than a single entity is performing a hash function) may all same.

If the client receives the set of hashes without the actual set of data, the client may query a hosted cache for the data based on the hashes 905. The hosted cache may determine whether it has the data corresponding to the set of hashes 906. If the hosted cache contains the data, then the client may retrieve data from the hosted cache based on the hashes it received from the application server 907. Optionally, the client may also perform a data integrity check on the data received by the hosted cache using the hashes 908. As known by those skilled in the art, hashes may provide a unique fingerprint of the data that is used to generate the hash. Thus, one method of verifying the integrity and identity of the data received by the client from the hosted cache is to execute a same hash function (e.g., a hash function known to be common between the server that provided the hash and the hosted cache) on the data from hosted cache to see if the same hashes result from that data. If so, the integrity and identity of the data may be verified. If the data is determined to be verified and valid 909, the client may consume the retrieved data at block 910. If the data is not verified and thus, not invalid, the set of data may be retrieved from the server and the hosted cache may be updated with new data retrieved from the server 911.

If the hosted cache does not contain the requested data, several methods may be implemented to populate the hosted cache with the set of data 911 and provide the set of data to the client 912. In one embodiment, the hosted cache may implement the functionality of retrieving data requested by a client that it does not currently store. For example, the hosted cache may be programmed to request the data from the application server. In this case, the application server may return the data to the hosted cache with or without hashes and the hosted cache may then provide the requested data to the requesting client. The hosted cache may then store the new data along with hashes received from the server or based on hashes it generates based on the data. When the hash functions used by hosted cache and server are the same, the method and system of this embodiment may operate to provide the same hash index to the client for later retrieval.

In another embodiment, the client may take on the responsibility of retrieving data from the application server that is not stored in the hosted cache. For example, when the hosted cache returns a message to the client indicating that it does not currently store the data requested by the client based on the hashes the client sent, the client may then send a second request to the application server for the data. In this situation, the client may send with the second request to the application server an indication that the hosted cache does not contain the requested data. In one embodiment, this may be performed by indicating that the client is not enabled to use a hosted cache. In this situation, the application server may simply provide the requested data to the client and the client may then push the data to the hosted cache. The data may be hashed by either the server, the client or the hosted cache. In another embodiment, the indication that the hosted cache may not currently have the requested data may be sent as a separate indication. For example, a header in the second request from the client to the application server may include both an indication that the client is enabled to use a hosted cache and that the hosted cache does not include the requested information. In this example, the server may return the requested data as a well as a hash of the requested data.

In one embodiment, instead of waiting for the hosted cache to be populated from scratch based on initial client requests, the hosted cache may be pre-populated with a set of data known to have a high access rate. This may be done via scheduled loading during system downtime.

Data management of the hosted cache may be performed by periodic purging of data in the hosted cache by time stamps. For example, each data segment or block may be time coded by a number of variables (creation date, receipt date, etc.). When a present time duration from the time stamp elapses, the data block may be deleted. This provides a mechanism for keeping the data relatively fresh. For example, when data is deleted, that data (when required) will be more recently downloaded with a new version from the application server. An important thing to note about hashed data is that a single file may be indexed by a plurality of hashes. Moreover, two or more files may have a common data block containing the same hash. Data may be purged by data blocks and thus a data file may contain some deleted portions which may need to be retrieved afresh from the application server.

Figure 10:
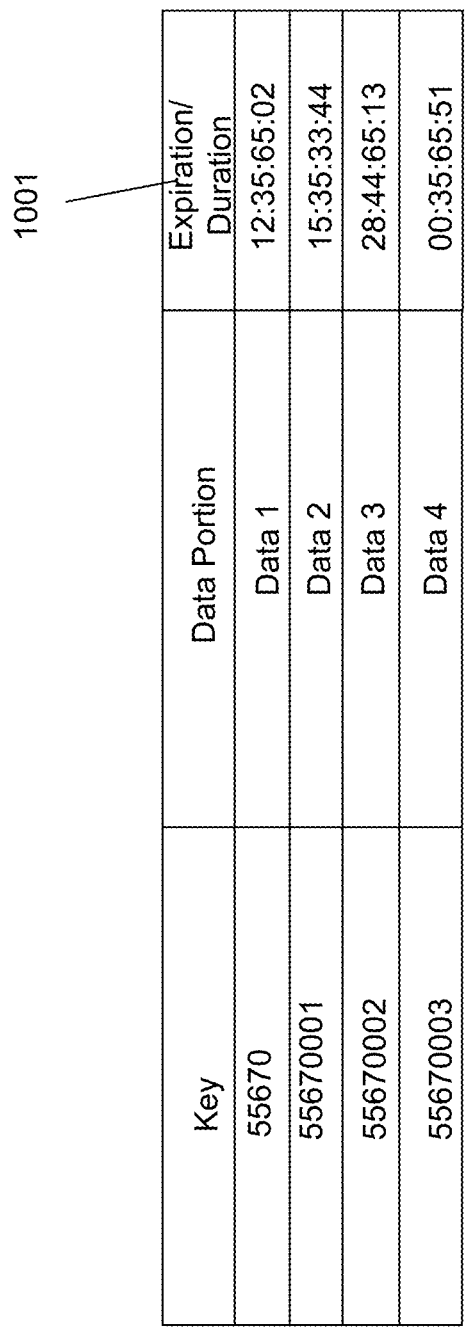
FIG. 10 illustrates a record format using an expiration parameter.

In an embodiment illustrated in FIG. 10, an expiration parameter 1001 may be included with each record. The records may persist in the hosted cache until they are explicitly deleted by the publisher or until they expire based on the expiration parameter. This expiration parameter 1001 may correspond to a duration when the data is valid. The expiration parameter 1001 may indicate a expiration of validity for the record. Thus, the expiration parameter 1001 may be used in the retrieval process as illustrated in FIG. 9. For example, at block 909, an expiration indicated by the expiration parameter 1001 may be checked to determine whether the expiration has expired. If the expiration parameter 1001 is expired, then the record may be invalid and block 911 may be used to retrieve new data from the server. Otherwise, the record may be valid and consumed by the client 910.

Hosted Cache Discovery Process

The hosted cache may be implemented with a discovery protocol. The discovery protocol may be any suitable protocol that provides clients the ability to detect the existence of a hosted cache on a network. The discovery mechanism may be explicit or automatic. For example, in an explicit discovery protocol a client may be directed to a register that provides information regarding any registered hosted cache(s). Alternatively, explicit discovery may be implemented using a group computing policy or script directing each computing device to a particular hosted cache. In an automatic discovery embodiment, a connecting client may be pushed the information regarding the existence of a hosted cache on a network segment that is accessible to the client. It should be noted, that even though a client may be connected to a branch including a plurality of client machines in proximate geographic location to each other, the client machines may be segmented into domains or subnets where access is restricted within or between the domains or subnets.

In one embodiment, a client enabled to use a hosted cache may use a predetermined discovery protocol to determine if a hosted cache is available on a network of the client. In other words, the client may be programmed to communicate using a particular discover protocol when connected to a network. As a note, a client may represent a client application or a client device. In an alternative embodiment, the client may be responsible for publicizing its own availability or existence when connected to a network. The discovery protocol may also provide a mechanism for publishing existence of a client where the client and hosted cache are made aware of each other based on a communication domain. For example, the client may be configured to be mobile (e.g., a laptop) where the client may connect to a first network or a second network (e.g., based on domains or subnets), where each network may have a separate hosted cache. In either case, the discovery protocol may be adapted to work with the client to provide a hosted cache in the network in which the client is directly connected to.

Optimization Monitoring

Monitoring of data traffic over the system of the hosted cache and corresponding server may be performed to provide further optimizations to the described system. For example, some data transmission parameters that may be monitored include latency of data requests from the client. Another variable may be frequency of access by clients to the hosted cache versus frequency of access over the WAN connection. The monitoring and recording of the data traffic and analysis may allow network administrators to adjust operating parameters of the described method and system. For example, based on the monitoring data, the administrators may discover which data may be pre-populated during off-peak times.

Integration with Existing WAN Optimizers

In one embodiment, the client side WAN optimizer device may be adapted to operate as a hosted cached. In this embodiment, no server side WAN device is necessary. In one embodiment, a WAN optimizer devices may be used in addition to the hosted cache. Because WAN optimizers are generally not able to handle encrypted files, the WAN optimizers may be used for general data or file access between a client and a server whenever data is not being encrypted for transmission. For encrypted data, the hosted cache implementation may used. This configuration may be done in networks having legacy systems or devices, for example, devices that are not configured to recognize or communicate with a hosted cache. In another embodiment, when a client is not able to use the hosted cache, it may use an existing WAN optimizer system (e.g., one including both server and client side WAN optimizer component devices), while those clients that are able to use the hosted cache may do so. The server may determine how to respond to client requests for data via information embedded in the data request message (e.g., via a head as described).

A benefit of using the claimed method and system is that there may be a reduced need to include and maintain two component boxes at both a server and client side of WAN. This reduces maintenance costs. Moreover, encrypted data may now be sent over the WAN while still achieving and/or surpassing the latency improvements provided by existing WAN optimizer systems. Another benefit of the described method and system is the reduction in processing capacity required to perform detailed inspection of data to provide indexing and compression. In other words, WAN optimizers index the data to a finer granularity that requires greater processing capacity. Instead, the claimed method and system generates hashes based on the data, where hashing functions are generally efficient and quick and does not require much processing overhead.

Another benefit of the described method and system is that it generally eliminates the requirement of an intermediary device between client and server over the WAN. Instead, the described method and system uses a hosted cache contained within the confines of a secured branch environment. The question arises about the situation in which the cache is not populated with the requested data. Then the data may be sent in any manner negotiated between the client and application server. In other words, the data may be encrypted or unencrypted. Eliminating the man in the middle refers to removing any working parts between the client and server over the WAN.

Another benefit is protocol independence. Existing WAN optimizers may need to be programmed to use a number of different protocols to operate. The method and system of this application simply sends hashes over existing protocols used between the server and client.

The invention claimed is:

1. A method of reducing bandwidth utilization of a network, the method comprising:
   receiving, at a server, a first request message from a client over the network, wherein the first request message contains an indication of a first set of data stored at the server;
   determining, at the server, that the first request message is a request for encrypted data and the first request message contains an indication that the client is enabled to use a hosted cache;
   generating a set of hashes using the first hash function for the first set of data stored at the server, wherein the set of hashes includes a first plurality of hashes corresponding to a first file, wherein the first file includes a first plurality of data portions, wherein each of the first plurality of hashes has a corresponding data portion of the first plurality of data portions, and wherein each hash of the set of hashes represents a statistically unique fingerprint of each data portion of the set of data;
   transmitting, by the server to the client via the network, the set of hashes without the first set of data;
   receiving, by the server, a second request message from the client over the network, wherein the second request message contains an indication of a second set of data stored at the server;
   determining, at the server, that the second request message is a request for non-encrypted data; and
   providing to the client the second set of data.

2. The method of claim 1, further comprising providing the client a second hash function that corresponds to the first hash function used to produce the set of hashes for the first set of data.

3. The method of claim 1, wherein determining that the client is enabled to use the hosted cache includes determining that the client is enabled to use the hosted cache based on the indication in the first request message that the client is enabled to use the hosted cache.

4. The method of claim 1, wherein determining that the client is enabled to use the hosted cache includes determining that the client is enabled to use the hosted cache based on the indication in the first request message that the client is enabled to use the hosted cache.

5. The method of claim 1, wherein the hosted cache is configured to send a request to the server for the first set of data when the hosted cache does not contain the requested first set of data.

6. The method of claim 1, wherein the hosted cache is pre-populated with a set of data known to have a high access rate.

7. The method of claim 1, wherein the server maintains state and stores information indicating whether the first set of data has been previously requested and sent to a peer node accessible by the client.

8. A system for reducing bandwidth utilization of a network comprising:
   one or more processors; and
   a memory coupled to the one or more processors, the memory storing instructions that when executed by the one or more processors cause the one or more processors to:
   receive, at a server, a first request message from a client over the network, wherein the first request message contains an indication of a first set of data stored at the server;

determine, at the server, that the first request message is a request for encrypted data and the first request message contains an indication that the client is enabled to use a hosted cache;

generate a set of hashes using a first hash function for the first set of data stored at the server, wherein the set of hashes includes a first plurality of hashes corresponding to a first file, wherein the first file includes a first plurality of data portions, wherein each of the first plurality of hashes has a corresponding data portion of the first plurality of data portions, and wherein each hash of the set of hashes represents a statistically unique fingerprint of each data portion of the set of data;

transmit, by the server to the client via the network, the set of hashes without the first set of data;

receive, by the server, a second request message from the client over the network, wherein the second request message contains an indication of a second set of data stored at the server;

determine, at the server, that the second request message is a request for non-encrypted data; and provide to the client the second set of data.

9. The system of claim 8, wherein the one or more processors are further caused to generate the plurality of hashes based on an encryption algorithm, wherein the plurality of hashes are generated to be statistically unique for each of the plurality of data portions cached by the hosted cache.

10. The system of claim 8, wherein the one or more processors are further caused to:
provide the client a second hash function that corresponds to the first hash function used to produce the set of hashes for the first set of data.

11. The system of claim 8, wherein determining that the client is enabled to use the hosted cache includes determining that the client is enabled to use the hosted cache based on the indication in the first request message that the client is enabled to use the hosted cache.

12. The system of claim 8, wherein the client is configured to:
receive the first set of data; and
store a copy of the set of data into the hosted cache by hash values.

13. The system of claim 8, wherein the hosted cache is configured to send a request to the server for the first set of data when the hosted cache does not contain the requested first set of data.

14. The system of claim 8, wherein the hosted cache is pre-populated with a set of data known to have a high access rate.

15. The system of claim 8, wherein the server maintains state and stores information indicating whether the first set of data has been previously requested and sent to a peer node accessible by the client.

16. A computer memory comprising instructions that when executed perform a method for reducing bandwidth utilization of a network comprising: receiving, at a server, a first request message from a client over the network, wherein the first request message contains an indication of a first set of data stored at the server; determining, at the server, that the first request message is a request for encrypted data and the first request message contains an indication that the client is enabled to use a hosted cache; generating a set of hashes using a first hash function for the first set of data stored at the server, wherein the set of hashes includes a first plurality of hashes corresponding to a first file, wherein the first file includes a first plurality of data portions, wherein each of the first plurality of hashes has a corresponding data portion of the first plurality of data portions, and wherein each hash of the set of hashes represents a statistically unique fingerprint of each data portion of the set of data; transmitting, by the server to the client via the network, the set of hashes without the first set of data; receiving, by the server, a second request message from the client over the network, wherein the second request message contains an indication of a second set of data stored at the server; determining, at the server, that the second request message is a request for non-encrypted data; and providing to the client the second set of data.

17. The computer memory of claim 16, wherein the client is configured to: receive the first set of data; and store a copy of the first set of data into the hosted cache by hash values.

18. The computer memory of claim 16, wherein the hosted cache is further configured to send a request to the server for the first set of data when the hosted cache does not contain the requested first set of data.

19. The computer memory of claim 16, wherein the server is further configured to: track the first set of data that was transmitted to the client; and in response to further requests from the client for the first set of data, transmit the set of hashes corresponding to the first set of data to the client instead of transmitting the first set of data.

20. The computer memory of claim 16, wherein when at least one of the first plurality of data portions is invalid, the client is further enabled to indicate to the server that the client is not enabled to use the hosted cache.

* * * * *